(12) United States Patent
Riess

(10) Patent No.: US 8,500,872 B2
(45) Date of Patent: Aug. 6, 2013

(54) CERAMIC TUBES COMPOSED OF TWO MATERIALS

(75) Inventor: Ilan Riess, Moshav Beit-Shearim (IL)

(73) Assignee: Technion Research & Development Foundation Ltd., Haifa (IL)

( * ) Notice: Subject to any disclaimer, the term of this patent is extended or adjusted under 35 U.S.C. 154(b) by 265 days.

(21) Appl. No.: 12/811,221

(22) PCT Filed: Dec. 31, 2008

(86) PCT No.: PCT/IL2008/001701
§ 371 (c)(1),
(2), (4) Date: Sep. 28, 2010

(87) PCT Pub. No.: WO2009/083983
PCT Pub. Date: Jul. 9, 2009

(65) Prior Publication Data
US 2011/0107913 A1    May 12, 2011

Related U.S. Application Data

(60) Provisional application No. 61/018,592, filed on Jan. 2, 2008.

(51) Int. Cl.
*B01D 53/22* (2006.01)
*B01D 39/20* (2006.01)
*B01D 67/00* (2006.01)

(52) U.S. Cl.
USPC ............... 96/10; 96/4; 96/9; 95/45; 95/54; 156/89.11; 264/628; 264/634; 264/636

(58) Field of Classification Search
USPC ............ 96/4, 7, 9, 10; 95/45, 54; 156/89.11, 156/143, 296; 427/237; 264/628, 632, 634, 264/636
See application file for complete search history.

(56) References Cited

U.S. PATENT DOCUMENTS

| 4,780,160 | A | * | 10/1988 | Kipp ........................... 156/89.11 |
| 5,573,737 | A | | 11/1996 | Balachandran et al. |
| 5,820,654 | A | * | 10/1998 | Gottzman et al. ............... 95/54 |
| 6,620,272 | B2 | * | 9/2003 | Zaslavsky et al. ............ 156/73.5 |
| 7,938,893 | B2 | * | 5/2011 | Doong et al. ........................ 96/7 |

OTHER PUBLICATIONS

Zeng, Pingying et al., "Re-evaluation of $Ba_{0.5}Sr_{0.5}Co_{0.8}Fe_{0.2}O_{3-\delta}$ Perovskite as Oxygen Semi-permeable Membrane", Journal of Membrane Science, 291, 2007, pp. 148-156.*
Merino, Nora A. et al., "Syntheis, Characterisation, Catalytic Activity and Structural Stability of $LaCo_{1-y}Fe_yO_{3\pm\lambda}$ Perovskite Catalysts for Combustion of Ethanol and Propane", Journal of Catalysis, 240, 2006, pp. 245-257.*

(Continued)

*Primary Examiner* — Jason M Greene
(74) *Attorney, Agent, or Firm* — Edward Langer, Adv and Patent Attorney

(57) ABSTRACT

The invention is a ceramic tube made of two parts. A first part of the tube is made of a sensitive material for facilitating oxygen separation in the membrane. The second part is made of a different material that does not react with CO2 and/or H2O. Accordingly, by means of this Invention, there is provided a ceramic tube that is stabilized and does not deteriorate upon exposure to CO2 and/or H2O at temperatures below the operating temperatures.

22 Claims, 2 Drawing Sheets

OTHER PUBLICATIONS

Kharton, Vladislav V. et al., "Research of the Electrochemistry of Oxygen Ion Conductors in the Former Soviet Union. II. Perovskite-related Oxides", Journal of Solid State Electrochemistry, 3, 1999, pp. 303-326.*

Li et al. "Tubular lanthanum cobaltite perovskite type membrane for Oxygen permeation", J. Membrane Science 166 (2000).

Yi et al. "Oxygen permeability and stability of $Sr_{0.95}Co_{0.8}Fe_{0.2}O_{3-d}$ in a $CO_2$ and $H_2O$-containing Atmosphere", Chem. Mater. 2005, 17, 5856-5861.

Zeng et al. "RE-evaluation of $Ba_{0.5}Sr_{0.5}Co_{0.8}Fe_{0.2}O_3$ perovskite as oxygen semi-permeable membrane", J. Membrane Science 291 (2007) 148?156.

Merino et al, "synthesis characterization, catalytic activity and structural stability of $LaCo_{1-y}Fe_yO_3$ perovskite catalysts for combustion of Ethanol and Propane", J. Catalysis 240 (2006) 245.

Kharton et al. "Research on the electrochemistry of oxygen ion conductors in the former Soviet Union. II perovskite-related oxides", J Solid State Electrochem (1999) 3: 303-326.

* cited by examiner

View III-III

View IV-IV

CERAMIC TUBES COMPOSED OF TWO MATERIALS

CROSS REFERENCE TO RELATED APPLICATION

The present Application is based on International Application No. PCT/IL2008/001701 filed on Dec. 31, 2008, which is based on US Provisional Application No. 61/018,592 filed on Jan. 2, 2008.

FIELD OF THE INVENTION

The present invention relates primarily to oxygen separation membranes and, in particular, to ceramic tubes utilized in such applications.

BACKGROUND OF THE INVENTION

Ceramic membrane devices are used to efficiently separate oxygen gas using heat and electricity without any moving parts, and can even be used to produce pure oxygen under pressure by electrical current flow only. Ceramic membranes are less than one millimeter thick. At room temperature they are completely impervious to all gases, but allow oxygen to pass through when heated to high temperatures. One type of ceramic tube membrane has a porous electrode on each side of the membrane, enabling an electrical voltage difference to be applied across the membrane. At high temperature, oxygen on one side of the membrane will collect extra electrons to form negatively charged oxygen ions. These ions conduct through the membrane, being driven by the voltage difference across the membrane. In a second type, the ceramic membranes conduct both oxygen ions and electrons. When a gas pressure difference is applied across these membranes, oxygen ions form on one side by catalytic action, but their conduction through the membrane is pressure-driven, and electrons flow in the opposite direction.

Oxygen separation by ceramic membranes is based either on a solid electrolyte that conducts oxygen ions only or on a mixed ionic electronic conductor. In the first type of device with a solid electrolyte, two electrodes and leads or current collectors have to be used; and, the oxygen ionic current is driven by an applied voltage. In the second case with a mixed ionic electronic conductor, there is no need for extra layers (electrodes) and a pressure difference drives the oxygen ionic current through the permeation membrane.

Ceramic tubes are well known in industry and have many different uses. In most situations, the ceramic tubes are made of a single material, which is usually a single phase. Due to their inherent properties, ceramic tubes have been found to be of particular usefulness in oxygen separation membranes. The use of a tube comes from the need to have good sealing when separating oxygen for example. It is difficult to achieve sealing at elevated temperatures and the tube having a cold part at room temperature allows this to be achieved at room temperature.

A group of ceramic oxide materials with the perovskite structure are, in particular, used to make ceramic membranes for oxygen separation. Preferably the perovskite is $Ba_{0.5}Sr_{0.5}Co_{0.8}Fe_{0.2}O_{3-\delta}$ (sometimes known as BSCFO or BSCF). This material exhibits a very high permeability of oxygen, thereby making it very well suited for oxygen separation membranes.

In order to optimize the oxygen separation process, certain electrical properties of the material are useful. This includes high electron and oxygen ion conductivities. Only certain perovskites exhibit this. Among the various suitable perovskites, BSCFO is the best, as it has a high electron (hole) conductivity, the highest ionic conductivity and thus the highest overall high oxygen permeation flux. Not only perovskites exhibit oxygen permeation, but they are among the best i.e. exhibit the highest (normalized) permeation rate.

Despite its advantages, BSCFO ceramic tubes have a key disadvantage. At temperatures below 850° C., such tubes react with $CO_2$ and $H_2O$ and can thus deteriorate. This instability is primarily caused by the components Barium (Ba) and Strontium (Sr). Further, generally any perovskite ceramic, which has either Barium or Strontium, will suffer from this same problem. The exact limiting temperature need not be 850° C., as it varies between Ba and Sr and between $CO_2$ and $H_2O$ and it depends also on the concentration of $CO_2$ and $H_2O$. For instance 820° C. is a limiting temperature for BaO (a component in BSCFO) in the presence of ambient $CO_2$ concentration. In this case one could safely use 850° C. as the working temperature Therefore, there is a need in the industry to provide a perovskite ceramic tube that will not react with $CO_2$ or $H_2O$ and deteriorate at temperatures below 850° C.

SUMMARY OF THE INVENTION

These and other objects of the present invention may be obtained from a ceramic tube made of two parts.

A first part of the tube is made of a sensitive material, such as BSCFO, for facilitating oxygen separation in the membrane. The second part is made of a different material that does not react with $CO_2$ or $H_2O$.

The BSCFO part is kept at a high temperature (above 850° C.) at which adverse chemical reactions with $CO_2$ and/or $H_2O$ do not take place. The other material of the second part is exposed to lower temperatures down to room temperature. It need not allow permeation of oxygen. It serves to connect the active hot BSCFO part to the housing which is at room temperature No one in the industry knew to combine two materials into one tube and thereby allowing the use of BSCFO. In point of fact, the prevailing opinion was that, while BSCFO is a very good oxygen permeation material, it cannot be used since it deteriorates with time due to interaction with $CO_2$ and $H_2O$ which are present in the atmosphere. Thus by combining BSCFO with another material, the instant invention achieves a productive, new and novel application that the industry thought could not be achieved.

Accordingly, by means of the present invention, there is provided a ceramic tube that is stabilized and does not deteriorate upon exposure to $CO_2$ or $H_2O$ when exposed to a range of temperatures below the operating temperatures.

Other features and advantages of the invention will become apparent from the following drawings and description.

BRIEF DESCRIPTION OF THE INVENTION

For a better understanding of the invention with regard to the embodiments thereof, reference is made to the accompanying drawings, in which like numerals designate corresponding elements or sections throughout, and in which.

DETAILED DESCRIPTION OF THE INVENTION

In a broad sense, the present invention is about using two materials to form a single tube. One material is functional for one purpose and the other for another purpose. The first material can do one task, but under certain restricting conditions; and, the second material can operate under these restricting conditions, but do something else. In this way the materials complement each other, and thereby form a single tube that can do a desired complex task.

To be specific, the task the first material does is to allow permeation of oxygen through it. This has to be done under certain conditions, i.e. high temperatures. The second material operates at lower temperatures and its task is to hold or support the first material and allow connection to a device housing at a cold end of the tube, which is at room temperature. The second material need not and in many cases cannot do the task of the first material, i.e. allow oxygen to permeate through it. Even if the second material does allow oxygen permeation, then the performance is worse as compared to that of the first material. The first material is, therefore, preferred to do the task of oxygen permeation.

Figure 1:
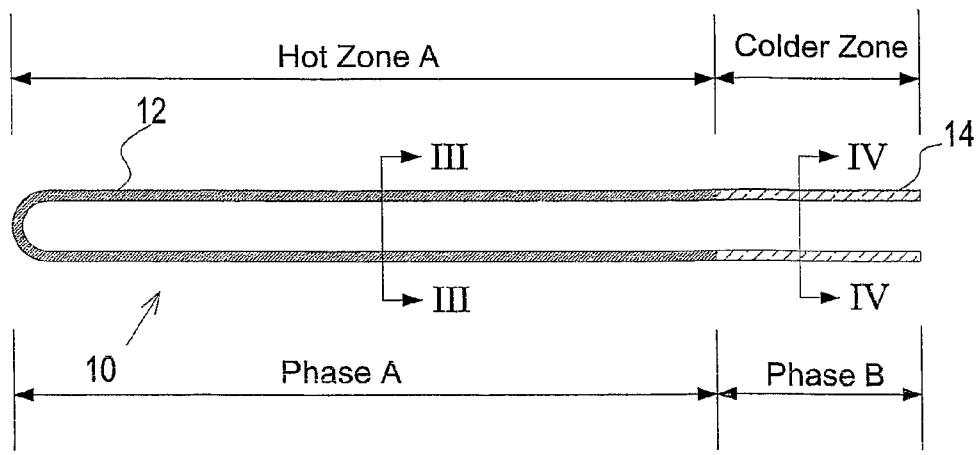
FIG. 1 is a view showing a two part ceramic tube, according to the teaching of the present invention.
Figure 2:
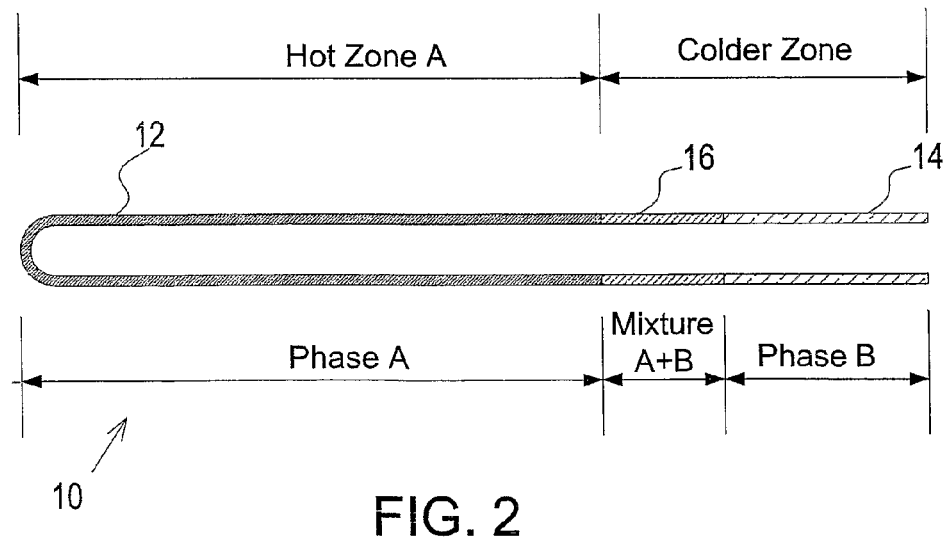
FIG. 2 is a view similar to FIG. 1, but additionally showing a transition region between the active part and the handle part., according to the teaching of the present invention.
Figure 3:
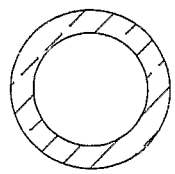
FIG. 3 is a cross sectional view, along line III-III of FIG. 1, showing the composition of the material for the active part (Hot zone—Phase A)
Figure 4:
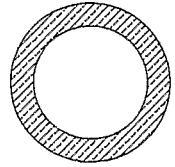
FIG. 4 is a cross sectional view similar to FIG. 3, along line IV-IV of FIG. 1, but showing the composition of the material of the handle part (Colder zone—Phase B).

The restricting condition for the first material is that it cannot be used at intermediate temperatures due to harmful interactions with $CO_2$ and $H_2O$ in the atmosphere. Carbonates and hydroxides are the products of these reactions. The first material cannot be used along the whole tube, i.e. make the tube of a single material, as there is a temperature gradient along the tube. At the high temperature end, the first material can be used. At room temperatures, it could also be used as the harmful reactions are sluggish. The problem is that part of the tube, between the part kept hottest and the part kept cold at room temperature, denoted as the "colder zone" in FIGS. 1 and 2, would be at an intermediate temperatures range of a few hundred Celsius, where harmful reactions can occur quickly. By combining the two materials, the first part (Phase A) is kept at elevated temperatures for which the harmful reactions does not take place (in the instant case above 850° C.), while the second material (Phase B) forms the rest of the tube and is exposed to the intermediate temperatures down to room temperature.

In order to match possible differences in thermal expansion coefficients, it is preferable to also use an intermediate composition (Intermediate Composition I) of the two materials in between the above mentioned parts where each is made of one of the materials.

It turns out that heating above a certain limiting temperature is an effective method for resolving the expected adverse reaction with $CO_2$ as well as with $H_2O$.

A standard ceramic tube used in an oxygen separation membrane is subjected to a very broad range of temperatures. At one extreme it is exposed to temperatures above 850° C., but the other extreme is room temperature (about 20° C.). The so called "cold zone" is about room temperature and is needed so that the ceramic tube can be connected to the housing of the cell. This cannot be accomplished at very high temperatures. At elevated temperatures (above 850° C.), there is no problem with using a sensitive material. The temperature is high enough that it will not react with the $CO_2$ or $H_2O$ and deteriorate. It is only when the ambient temperature is lower and the ceramic tubes are exposed to it that the problem arises.

The colder zone has a broad range of temperatures of several hundreds of degrees, extending from just below the elevated temperatures all the way down to room temperature. If it is made of only the sensitive material, the part in the lower temperature range will react with $CO_2$ and/or $H_2O$ and deteriorate.

When the cell is turned on (or off), the ceramic tube necessarily is heated (or cooled) and passes temporarily through temperatures where it will also react with $CO_2$ and/or $H_2O$ and deteriorate. To solve this additional problem is it intended to heat and cool the tube rapidly.

A ceramic tube is, therefore, proposed in the present invention that has a sensitive material (Phase A) for use at elevated temperatures and also a colder zone (Phase B) for use when connecting to the housing of the cell.

According to the present invention, the ceramic tube 10 has two parts 12 and 14. The first part 12 is for use in the hot temperature zone and is made of an oxygen permeable material. Preferably it is perovskite and the best results seem to result from use of $Ba_{0.5}Sr_{0.5}Co_{0.8}Fe_{0.2}O_{3-\delta}$ (BSCFO). This part of the ceramic tube is kept at a sufficiently high temperature so that it does not react with $CO_2$ or $H_2O$ and deteriorate.

Among the possible other materials for the sensitive first part 12 are: $La_{1-x}Sr_xCo_{1-y}Fe_yO_{3-\delta}$ with $0<x,y<1$, in particular: $x=0.2$, $0.4$, $0.5$, $y=0.2$, $0.5$, $0.8$, $1.0$ and also $SrCo_{0.8}Fe_{0.2}O_{3-\delta}$. The best materials (highest permeation flux) contain Ba and Sr and then Ba or Sr. Others for example without Sr and Ba are $LaCo_{1-x}Ni_xO_3$, $LaCo_{1-x-y}Fe_xNi_yO_3$, $x=0.1-0.2$, $y=0.1-0.3$ and also $LaGa_{1-x}Ni_xO_{3-\delta}$. There are many other suitable substances for the sensitive part, but the permeation flux is lower than for BSFCO.

The second part 14 of the ceramic tube is generally elongate, like a type of handle. It is made of a different ceramic material and is not sensitive to $CO_2$ or $H_2O$ and does not react to them; therefore, it does not deteriorate when exposed to it. Preferably it should also not be sensitive to other harmful gases.

The harmful gases that prevail in a normal atmosphere are $CO_2$ and water vapor $H_2O$, but they are harmful at intermediate temperatures only. At low temperatures, the reaction rate is practically zero and at elevated temperatures, such as 900° C., the products of such reaction are not stable. In particular for $CO_2$, Ba forms $BaCO_3$ and Sr, $SrCO_3$. However, this occurs below about 850° C. for room atmosphere at standard pressure of one atmosphere. The exact limiting temperature depends on whether one considers Ba or Sr and it increases when the $CO_2$ partial pressure or $H_2O$ partial pressure increases.

Necessarily the second part may not be made of Barium or Strontium or Calcium, as they react to $CO_2$. Preferably it should be made of $LaCoO_{3-\delta}$ (Lanthanum cobaltite) or $LaCo_{0.8}Fe_{0.2}O_{3-\delta}$ (sometimes known as LCF or as doped Lanthanum cobaltite).

The preferred material of the second end is one that has a similar expansion coefficient and similar sintering temperature to the sensitive material of the first part. In most cases, the sintering temperature is about 1100-1300° C. In some applications, it may be hard to match the expansion coefficient and it may, therefore, be desirable to include an intermediate region where there is an intermediate composition which is a mixture of phases A and B. Materials that have a rather close expansion coefficient to that of BSCFO ($\sim 18 \times 10^{-6}$ under reduced oxygen partial pressure of $10^{-5}$ bar (J. F. Vente et al., J. membr. Sci., 276 (2006)178-184) and $19.7 \times 10^{-6} K^{-1}$ in air (B. Wei et al. Electrochem. Solid-State Lett. 8 (2005) A428-

A431)) and can be used for the second part include: $LaCo_yFe_{0.2}Ni_{0.2}O_{3\delta}$, y=0.5 and 0.6 with expansion coefficients ($\alpha$): $18\times10^{-6}$ and $19.2\times10^{-6}$ ($K^{-1}$) respectively (B. Wei et al. Electrochem. Solid-State Lett. 8 (2005) A428-A431).

As is known, the expansion coefficient can be tuned by slightly changing the composition of Co. This material does not contain Sr neither Ba. (It also exhibits oxygen permeation but lower and is used here for a different purpose). Other example: $LaGa_{0.3}Co_{0.6}Mg_{0.1}O_{3\delta}$, $LaGa_{0.4}Co_{0.4}Mg_{0.2}O_{3\delta}$, $LaGa_{0.4}Co_{0.35}Mg_{0.25}O_{3\delta}$, exhibit $\alpha=19.8\times10^{-6}$, $15.4\times10^{-6}$ and $12.4\times10^{-6}$ ($K^{-1}$) (B. Wei et al. Electrochem. Solid-State Lett. 8 (2005) A428-A431). Again small changes in composition allow tuning the expansion coefficient to match that of BSCFO. These materials do not contain Sr or Ba.

When selecting the material for the second part of the ceramic tube, it must be such that it will create a sufficiently dense and strong tube. Preferably it should have the same (or at least a similar) coefficient of expansion as the sensitive material. If there are significantly different coefficients, the integrity of the tube is obviously compromised.

As is known in the industry, the ceramic tube may be made by extrusion. First the sensitive material of the active part is extruded, followed by the inactive material for the colder zone. It may also be prepared in two parts by slip casting and gluing by sintering the parts together.

The composition of the thus ceramic extruded tube of the present invention is varied by varying the composition of the material being extruded. When material is continuously supplied from two containers, then the supply should be regulated as required. If only one container is used, then the different compositions should be placed in the correct order and supplied accordingly.

Effectively the ceramic tube has either two or three parts or phases. There is the sensitive or active portion or hot zone (part 12), the inactive portion or colder zone (part 14) and a possible transition portion (part 16) containing a mixture of the two materials.

One way to effect the mixing is to put into the extruder a mixture of the two materials in between the active and inactive phases (or portions). Alternatively, no mixture is used, and the extruding process itself creates mixing and inter growths of the two materials, shown in FIG. 2.

An advantage of the transition portion is that it compensates for any small difference between the coefficients of expansion of the two materials.

Due to rapid heating, there is no longer a problem with the sensitive material being exposed to $CO_2$ or $H_2O$ and deteriorating. With new techniques, the heating can be accomplished in about 10-100 seconds. The heating rate is limited mainly by the stability of the ceramic tube. Since the sensitive material is exposed to low temperature for only a very short time, the problem of exposure to $CO_2$ or $H_2O$ and deterioration is substantially eliminated.

This new and unique two part ceramic tube is stable at elevated, continuous working temperatures and can still be used at lower temperature to connect to the housing of a cell.

The present invention is described in detail with reference to a particular embodiment, but it should be understood that various other modifications can be effected and still be within the spirit and scope of the invention, as defined by the appended claims.

I claim:

1. A single dense ceramic tube composed of a first end composed of an oxygen permeable material for use in an oxygen separation membrane and of a second end composed of a different material and said material of said second end not reacting to $CO_2$ at the temperature between 850° C. and room temperature, wherein said ceramic tube has a uniform cross section along any axis perpendicular to the axis of the ceramic tube.

2. A single ceramic tube according to claim 1, wherein said first end is composed of $Ba_{0.5}Sr_{0.5}Co_{0.8}Fe_{0.2}O_{3-\delta}$.

3. A single ceramic tube according to claim 1, wherein second end is composed of $LaCoO_{3-\delta}$ or $LaCo_{0.8}Fe_{0.2}O_{3-\delta}$.

4. A single ceramic tube according to claim 2, wherein second end is composed of $LaCoO_{3-\delta}$ or $LaCo_{0.8}Fe_{0.2}O_{3-\delta}$.

5. A single ceramic tube according to claim 1, wherein the second end is not composed of Barium or Strontium or Calcium.

6. A single ceramic tube according to claim 2, wherein the second end is not composed of Barium or Strontium or Calcium.

7. A single ceramic tube according to claim 1, wherein said first end is composed of a material including Barium and Strontium.

8. A single ceramic tube according to claim 1, wherein said first end is composed of a material including Barium or Strontium.

9. A single ceramic tube according to claim 1, wherein said first end is composed of $La_{1-x}Sr_xCo_{1-y}Fe_yO_{3-\delta}$. with 0<x,y<1, in particular: x=0.2, 0.4, 0.5, y=0.2, 0.5, 0.8, 1,0 ; $SrCo_{0.8}Fe_{0.2}O_{3-\delta}$; $LaCo_{1-x}Ni_xO_3$, $LaCo_{1-x-y}Fe_xNi_yO_3$, x=0.1-0.2, y=0.1-0.3; or $LaGa_{1-x}Ni_xO_{3-\delta}$.

10. A single ceramic tube according to claim 1 wherein said second end has a similar expansion coefficient and similar sintering temperature to the first end.

11. A single ceramic tube according to claim 1, wherein said second end is composed of $LaCo_yFe_{0.2}Ni_{0.2}O_{3-\delta}$, y=0.5 and 0.6 with expansion coefficients ($\alpha$): $18\times10^{-6}$ and $19.2\times10^{-6}$ ($K^{-1}$) respectively; or $LaGa_{0.3}Co_{0.6}Mg_{0.1}O_{3-\delta}$, $LaGa_{0.4}Co_{0.4}Mg_{0.2}O_{3-\delta}$, or $LaGa_{0.4}Co_{0.35}Mg_{0.25}O_{3-\delta}$, with expansion coefficients exhibit $\alpha=19.8\times10^{-6}$, $15.4\times10^{-6}$ and $12.4\times10^{-6}$ ($K^{-1}$) respectively.

12. A single dense ceramic tube composed of a first end composed of an oxygen permeable material for use in an oxygen separation membrane, a second end composed of a different material and said material of said second end not reacting to $CO_2$ at the temperature between 850° C. and room temperature, and a transition portion between said first and second ends, and wherein said transition portion being composed of a material that is a mixture of materials of said first and second ends, wherein said ceramic tube has a uniform cross section along any axis perpendicular to the axis of the ceramic tube.

13. A single dense ceramic tube composed of a first end composed of an oxygen permeable material for use in an oxygen separation membrane and of a second end composed of a different material and said material of said second end not reacting to $H_2O$ at the temperature between 850° C. and room temperature, wherein said ceramic tube has a uniform cross section along any axis perpendicular to the axis of the ceramic tube.

14. A single dense ceramic tube composed of a first end composed of an oxygen permeable material for use in an oxygen separation membrane and of a second end composed of a different material and said material of said second end not reacting to $CO_2$ and $H_2O$ at the temperature between 850° C. and room temperature, wherein said ceramic tube has a uniform cross section along any axis perpendicular to the axis of the ceramic tube.

15. A single ceramic tube according to claim 1, wherein the ceramic tube being prepared by extrusion followed by sintering.

16. A single ceramic tube according to claim 1, wherein the ceramic tube being prepared by joining and sintering parts prepared by slip casting.

17. A single ceramic tube according to claim 12, wherein the ceramic tube being prepared by sintering said tube after being prepared by extrusion.

18. A single ceramic tube according to claim 1, wherein said first end and said second end are sintered together to form said single ceramic tube.

19. A single ceramic tube according to claim 1, wherein said first end being exposable to the temperature over 850° C. at which adverse chemical reactions with $CO_2$ and/or $H_2O$ do not take place, and wherein said second end being exposable to lower temperatures down to room temperature.

20. A single ceramic tube according to claim 12, wherein the ceramic tube being prepared by extrusion followed by sintering.

21. A single ceramic tube according to claim 13, wherein the ceramic tube being prepared by extrusion followed by sintering.

22. A single ceramic tube according to claim 13, wherein the ceramic tube being prepared by joining and sintering parts prepared by slip casting.

\* \* \* \* \*